United States Patent
Young et al.

[15] 3,689,563
[45] Sept. 5, 1972

[54] PREPARATION OF PERHALOALKYL NITROGEN-CHLORINE COMPOUNDS

[72] Inventors: David E. Young, Denville; Lowell R. Anderson; William B. Fox, both of Morristown, all of N.J.

[73] Assignee: Allied Chemical Corporation, New York, N.Y.

[22] Filed: Feb. 9, 1970

[21] Appl. No.: 9,953

[52] U.S. Cl. ............... 260/583 NH, 252/8.1, 252/77, 252/364, 260/566 D, 424/325
[51] Int. Cl. ................................................. C07c 87/02
[58] Field of Search ........................... 260/583 NH

[56] References Cited

UNITED STATES PATENTS

| | | |
|---|---|---|
| 3,057,849 | 10/1962 | Tullock ........ 260/583 NH UX |
| 3,052,723 | 9/1962 | Tullock ............ 260/583 NH |
| 3,137,728 | 6/1964 | Reid ............... 260/583 NH X |

*Primary Examiner*—Joseph Rebold
*Assistant Examiner*—Richard L. Raymond
*Attorney*—Arthur J. Plantamura and Herbert G. Burkard

[57] ABSTRACT

N,N-dichloro(chlorodifluoromethyl)amine having the following formula:

$$CF_2ClNCl_2,$$

prepared by reacting cyanogen chloride with either chlorine monofluoride or perfluoromethyl hypochlorite. It belongs to a family of compounds useful as flame retardants, fumigants and polymerization initiators. It is also an intermediate in the preparation of other similarly useful perhalogenated products. For instance, it may be dechlorinated to yield N-chloro(difluoromethylene)imine, $CF_2$ 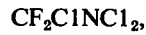 $NCl$, a new compound additionally useful as a source of the $CF_2$ $N\cdot$ radical. Thus, this imine may be reacted with a stoichiometric quantity of tetrafluoroethylene to yield a new N-perhaloethyl(difluoromethylene)imine, $CF_2NCF_2CF_2Cl$, which is a stable heat transfer liquid and polymer solvent.

3 Claims, No Drawings

PREPARATION OF PERHALOALKYL NITROGEN-CHLORINE COMPOUNDS

BACKGROUND OF THE INVENTION

Certain compounds related to $ClCF_2NCl_2$ are known and may be found, for instance, in U.S. Pat. No. 3,057,849. However, the preparation of this compound is not possible by the method described in this patent nor has it been heretofore described. Additionally, the novel dechlorination product, the imine $CF_2 = NCl$, and the reaction product of this novel dechlorinated imine with tetrafluoroethylene, $CF_2 = NC_2F_4Cl$, are made possible by the availability of the above compound.

DESCRIPTION OF THE INVENTION

This invention relates to the preparation of the novel compounds N,N-dichloro(chlorodifluoromethyl)amine, $CF_2ClNCl_2$, N-chloro(difluoromethylene)imine, $CF_2 = NCl$; and N-[2-chlorotetrafluoroethyl(difluoromethylene)]imine, $CF_2 = N-CF_2CF_2Cl$.

The novel dichloroamine, above, $CF_2ClNCl_2$, may be prepared by either reacting cyanogen chloride with two moles of chlorine monofluoride or by the reaction of cyanogen chloride with two moles of perfluoromethyl hypochlorite, according to the following reactions:

a. $ClC = N + 2 ClF \xrightarrow{25°C.} CF_2ClNCl_2$
b. $ClC = N + 2 CF_3OCl \xrightarrow{25°C.} CF_2ClNCl_2 + 2 COF_2$ In both of these reactions the starting materials are introduced into a closed system, such as in a stainless steel cylinder capped with a conventional metal needle valve, using standard vacuum techniques as described in the appended examples. The reaction is conducted at room temperature and is usually complete in 2–4 hours. Although room temperature is preferred because of convenience, the reaction may be conducted satisfactorily at temperatures of from 0° to about 50° C. The dichloroamine product is fractionated through trops at about −80° C. and −196° C., and is retained in the −80° C. trap. The yield of final product using either of the above synthetic methods is usually above 90 percent. Atmospheric, sub- or super-atmospheric pressures may be successfully employed; however, it is convenient to conduct this reaction under the autogenous pressure generated by the reaction and this is preferred. In order to insure complete reaction, at least the stoichiometric amount or preferably a slight excess of the chlorine monofluoride or the hypochlorite is employed, although large excesses will not deleteriously effect the reaction.

The synthesis of the basic N-chloroperfluoroalkyleneimine, $CF_2 = NCl$, in yields of greater than 80 percent is made possible by the dechlorination of the above $CF_2ClNCl_2$. This dechlorination may be conducted in a closed stainless steel system capped with a conventional needle valve. The $CF_2ClNCl_2$ is condensed into the system using standard vacuum techniques and heated at about 100°–150° C. for 2–5 hours, to yield $CF_2 = NCl$ and $Cl_2$. The free chlorine may be removed from the imine product, for instance, by shaking with mercury at room temperature. The pure $CF_2 = NCl$ is then separated from trace amounts of $CF_3NCl_2$ and unreacted $CF_2ClNCl_2$, by gas chromatography or other suitable methods. No azo-type compounds of the formula $RN = NR$, or azine-type compounds of the formula $R = N-N = R$, were observed in the thermolysis products.

The reaction temperature for this dechlorination is preferred 100° and 150°C., and particularly at 130° C., but it may be conducted as low as room temperature (25° C.) and as high as 200° C. At room temperature the reaction would be very slow and at 200° C. the rate of reaction may be increased, but the incidence of side reactions becomes more prevalent. It may be conducted at atmospheric, sub- and super-atmospheric pressures, but it is preferred to conduct the reaction at the autogenous pressure generated by the reaction.

Both, the new N-chloro-amine and -imine compounds above, are useful as flame retardants, fumigants, polymerization initiators and generally intermediates in the preparation of other halogenated amines and imines.

Furthermore, the above imine, $CF_2 = NCl$, may be reacted with tetrafluoroethylene in substantially stoichiometric quantities, at temperatures between 100°–200° C., and preferably at 150° C. in a closed system as described above, for about 2 to 6 hours and preferably about 4 hours, according to the following reaction:

$$CF_2 = NCl + C_2F_4 \xrightarrow{150°C.} CF_2 = NCF_2CF_2Cl$$

The product, N-[2-chlorotetrafluoroethyl(difluoromethylene)]imine, is a good solvent for highly fluorinated low molecular weight polymers and is a stable heat transfer liquid. It is preferred to conduct this reaction also under the autogenous pressure generated, although atmospheric, sub- or super-atmospheric pressures will not deleteriously affect the reaction. In small quantities, the $CF_2 = NCl$ acts as an initiator in the polymerization of tetrafluoroethylene.

The following examples are illustrative of specific embodiments of the novel compounds of this invention and the processes by which they are prepared:

EXAMPLE 1

A 30 ml stainless steel cylinder was charged with perfluoromethyl hypochlorite, $CF_3OCl$, (10 mmoles) and cyanogen chloride, ClCN, (5 mmoles), using conventional vacuum techniques in a Monel-Nickel system at −196° C. The reaction mixture was then warmed to ambient temperatures (20°–30° C.) in this system and allowed to stand at this temperature for 3 hours. Impurities were then separated from the product by fractionation between traps set at −80° C. and −196° C. The new product, a clear colorless liquid, was retained in the −80° C. fraction. It was identified by its gas density molecular weight, infrared spectrum, and its nmr spectrum, as $CF_2ClNCl_2$. The yield of this new product based on the starting cyanogen chloride was 91 percent.

ELEMENTAL ANALYSIS FOR $CF_2ClNCl_2$

| %C- | Found | 7.10 | Calc'd. | 7.06 |
|---|---|---|---|---|
| %F- | Found | 22.43 | Calc'd. | 22.33 |
| %Cl- | Found | 60.60 | Calc'd. | 62.43 |

EXAMPLE 2

A 30 ml stainless steel cylinder was charged with chlorine monofluoride (20 mmoles) and cyanogen chloride (10 mmoles) and reacted as in Example 1 above, the reaction proceeding as follows:

$$2 ClF + ClCN \xrightarrow{25°C.} CF_2ClNCl_2$$

The product was recovered in 90 percent yield and characterized as in Example 1.

EXAMPLE 3

A 30 ml stainless steel cylinder was charged with $CF_2ClNCl_2$ of Example 2, and the reactor heated at 125°–135° C. for 3 hours to dechlorinate the starting material as follows:

$$CF_2ClNCl_2 \xrightarrow{130°C.} CF_2 = NCl + Cl_2$$

The free chlorine was removed from the imine product by shaking with mercury at room temperature. Pure $CF_2NCl$ was then separated from trace amounts of $CF_3NCl_2$ and unreacted $CF_2ClNCl_2$ by gas chromotography. The product, a gas which boils at 5° C., was recovered in 81 percent yield and identified and characterized by its infrared, mass, fluorine-19 nmr spectra, and by elemental analysis.

ELEMENTAL ANALYSIS FOR $CF_2 = NCl$

| | | | | |
|---|---|---|---|---|
| %C- | Found | 12.16 | Calc'd. | 12.06 |
| %F- | Found | 38.10 | Calc'd. | 38.19 |

Examples 4 and 5 below, demonstrate that compounds analogous to the dichloroamine, $CF_2ClNCl_2$, of this invention cannot be dechlorinated by thermolysis in the same manner as the amine of this invention. In other words, the N-chloroimine product of Example 3 is a unique product made possible by the dechlorination of $CF_2ClNCl_2$.

EXAMPLE 4

A sample of $C_2F_5NCl_2$ was heated in a pyrex vessel at 200° C. for 30 hours. The only product recovered in 90 percent yield was $C_2F_5N = NC_2F_5$. There was no imine product such as $CF_3CF = NCl$ isolated as was the case in Example 3 above.

EXAMPLE 5

A sample of $CF_3NCl_2$ was treated as in Example 4. The only product recoverable in high yield was $CF_3N = NCF_3$. No imine product such as $CF_2 = NCl$ was recoverable from this reaction.

EXAMPLE 6

This experiment demonstrates the uniqueness and stability of the imine, $CF_2 = NCl$. A sample of $CH_2 = NCl$, when warmed in a closed system as in Example 4 at 25° C. for 1 hour, produces the trimer $(CH_2NCl)_3$. This trimer decomposes at 75° C. The N-chlorodifluoroimine, $CF_2NCl$, of this invention, neither polymerized nor decomposed under these or more testing conditions.

EXAMPLE 7

A 30 ml stainless steel cylinder was charged with $CF_2=NCl$ (5 mmoles) and tetrafluoroethylene, $C_2F_4$, (5 mmoles), using conventional vacuum techniques at −196° C. The reaction mixture was then allowed to react at 150° C. for about 4 hours. A product isolated in 75 percent yield, by gas chromotography from the crude mixture was identified by its infrared and mass spectra as N-[2-chlorotetrafluoroethyl(difluoromethylene)]imine, $CF_2 = NCF_2CF_2Cl$. It is a stable liquid at ordinary temperatures.

The foregoing detailed description has been given for clearness of understanding, although the invention is not limited to the exact details shown and described.

We claim:

1. N,N-dichloro(chlorodifluoromethyl)amine, $CF_2ClNCl_2$.

2. The method of preparing $CF_2ClNCl_2$ of claim 1, comprising reacting cyanogen chloride with chlorine monofluoride at a temperature of from about 0°C. to about 50°C.

3. The method of preparing $CF_2ClNCl_2$ of claim 1, comprising reacting cyanogen chloride with perfluoromethyl hypochlorite at a temperature of from about 0°C. to about 50°C.

* * * * *